(12) United States Patent
Ionel et al.

(10) Patent No.: US 7,737,598 B2
(45) Date of Patent: Jun. 15, 2010

(54) ELECTRIC MOTOR HAVING A STATOR

(75) Inventors: Dan M. Ionel, Fox Point, WI (US);
Stephen J. Dellinger, Houston, OH (US); Alan E. Lesak, Franklin, WI (US)

(73) Assignee: A. O. Smith Corporation, Milwaukee, WI (US)

( * ) Notice: Subject to any disclaimer, the term of this patent is extended or adjusted under 35 U.S.C. 154(b) by 272 days.

(21) Appl. No.: 11/776,296

(22) Filed: Jul. 11, 2007

(65) Prior Publication Data

US 2007/0252447 A1    Nov. 1, 2007

Related U.S. Application Data

(63) Continuation-in-part of application No. 10/914,462, filed on Aug. 9, 2004, now Pat. No. 7,247,967.

(51) Int. Cl.
*H02K 1/00*    (2006.01)
(52) U.S. Cl. .............................. 310/216.058
(58) Field of Classification Search ................. 310/216, 310/217, 218
See application file for complete search history.

(56) References Cited

U.S. PATENT DOCUMENTS

| | | | |
|---|---|---|---|
| 1,934,981 A | 11/1933 | Johnson | |
| 2,506,629 A | 5/1950 | Bilbe et al. | |
| 2,790,098 A | * 4/1957 | Nyyssonen | ................. 310/202 |
| 2,953,699 A | 9/1960 | Redding, Jr. | |
| 2,958,292 A | 11/1960 | Lipe et al. | |
| 3,131,462 A | 5/1964 | Owings et al. | |
| 3,390,289 A | 6/1968 | Dijken et al. | |
| 3,440,460 A | 4/1969 | Posterma | |
| 3,443,137 A | 5/1969 | McElroy | |
| 3,466,210 A | 9/1969 | Wareham | |
| 3,521,100 A | 7/1970 | Tamm | |
| 3,686,043 A | 8/1972 | Broyles et al. | |
| 3,694,903 A | 10/1972 | Deming | |
| 3,740,598 A | 6/1973 | Hallerback | |
| 3,742,269 A | 6/1973 | Holper et al. | |
| 3,813,763 A | 6/1974 | Church | |
| 3,834,013 A | 9/1974 | Gerstle | |
| 3,849,683 A | 11/1974 | Leistner | |
| 3,963,949 A | 6/1976 | Church | |
| 3,983,621 A | 10/1976 | Donahoo | |
| 4,438,558 A | 3/1984 | Mitsui | |

(Continued)

FOREIGN PATENT DOCUMENTS

EP    1720235    11/2006

(Continued)

*Primary Examiner*—Nguyen N Hanh
(74) *Attorney, Agent, or Firm*—Micheal Best & Friedrich LLP

(57) ABSTRACT

A stator configured to rotate a rotor with a number of magnetic poles includes a yoke that includes a back portion and a first type and first quantity of integral teeth, and a second type and second quantity of insertable teeth coupled to the back portion. At least two coils are wound with a continuous electric wire. Each of the coils is placed around two different integral teeth to define a first winding section. At least two other coils are wound with a continuous electric wire. The other coils are placed around two different insertable teeth to define a second winding section.

20 Claims, 13 Drawing Sheets

U.S. PATENT DOCUMENTS

| | | | |
|---|---|---|---|
| 4,780,953 A | 11/1988 | Wheeler et al. |
| 4,990,809 A | 2/1991 | Artus et al. |
| 5,095,610 A | 3/1992 | Schultz et al. |
| 5,173,651 A | 12/1992 | Buckley et al. |
| 5,176,946 A | 1/1993 | Wieloch |
| 5,276,958 A | 1/1994 | Larsen |
| 5,583,387 A | 12/1996 | Takeuchi et al. |
| 5,619,086 A | 4/1997 | Steiner |
| 5,729,072 A | 3/1998 | Hirano et al. |
| 5,767,606 A | 6/1998 | Bresolin |
| 5,786,651 A | 7/1998 | Suzuki |
| 5,880,549 A | 3/1999 | Chiba et al. |
| 5,918,360 A * | 7/1999 | Forbes et al. ............... 29/596 |
| 5,952,754 A | 9/1999 | Mok |
| 6,049,153 A | 4/2000 | Nishiyama et al. |
| 6,069,428 A | 5/2000 | Nelson |
| 6,107,718 A | 8/2000 | Schustek et al. |
| 6,127,753 A | 10/2000 | Yamazaki et al. |
| 6,153,951 A | 11/2000 | Morita et al. |
| 6,219,900 B1 | 4/2001 | Suzuki |
| 6,226,856 B1 | 5/2001 | Kazama et al. |
| 6,329,729 B1 | 12/2001 | Sakamoto |
| 6,448,685 B1 | 9/2002 | Mayer et al. |
| 6,504,284 B1 | 1/2003 | Kazama et al. |
| 6,630,766 B1 | 10/2003 | Kirn et al. |
| 6,634,080 B2 | 10/2003 | Bareis et al. |
| 6,658,721 B2 | 12/2003 | Kazama et al. |
| 6,670,732 B2 | 12/2003 | Sakamoto |
| 6,741,005 B2 | 5/2004 | Vohlgemuth |
| 6,777,852 B2 | 8/2004 | Ishikawa et al. |
| 6,856,065 B2 * | 2/2005 | Suzuki et al. ......... 310/216.074 |
| 6,975,049 B2 | 12/2005 | Ionel et al. |
| 7,003,867 B2 * | 2/2006 | Yamamoto et al. ............ 29/598 |
| 7,122,933 B2 | 10/2006 | Horst et al. |
| 2002/0121831 A1 | 9/2002 | Egawa et al. |
| 2004/0070304 A1 | 4/2004 | Enomoto et al. |
| 2004/0084989 A1 | 5/2004 | Schunk et al. |
| 2005/0067912 A1 | 3/2005 | Murakami et al. |
| 2005/0093381 A1 | 5/2005 | Ionel et al. |

FOREIGN PATENT DOCUMENTS

JP  10-004640  6/1998

* cited by examiner

ELECTRIC MOTOR HAVING A STATOR

RELATED APPLICATION DATA

The present application is a continuation-in-part of U.S. patent application Ser. No. 10/914,462 filed Aug. 9, 2004, titled "Electric Motor Having a Stator," now U.S. Pat. No. 7,247,967 the entire contents of which are fully incorporated herein by reference.

BACKGROUND

The invention relates to a stator for an electric motor and a method of manufacturing and assembling the stator.

SUMMARY

In one embodiment, the invention provides a stator that defines a stator axis. The stator includes a yoke and a plurality of teeth. Each tooth is coupled to the yoke and defines a first recess, a first tooth end, and a second tooth end axially opposite the first tooth end. The first recess extends axially from the first tooth end toward the second tooth end. A first coil includes a first end coil and a second end coil. The first coil is positioned on a first of the plurality of teeth such that the first end coil is disposed within the first recess such that the first end coil does not extend axially beyond the first tooth end.

In another embodiment, the invention provides a stator that includes a yoke that extends in a lengthwise direction to define a core length. A tooth includes a tooth top coupled to the yoke and a coil-receiving portion. The tooth top extends in a lengthwise direction a first distance substantially equal to the core length, and the coil-receiving portion extends in a lengthwise direction a second distance that is shorter than the core length. A coil is disposed around the coil-receiving space and defines a coil length that is substantially the same as the core length.

The invention also provides a stator configured to rotate a rotor with a number of magnetic poles. The stator includes a yoke that has a back portion and a first type and first quantity of integral teeth. A second type and second quantity of insertable teeth are coupled to the back portion and at least two coils are wound with a continuous electric wire. The coils are placed around two different integral teeth to define a first winding section. At least two other coils are wound with a continuous electric wire. The coils are placed around two different insertable teeth to define a second winding section.

In yet another construction, the invention provides a stator including a plurality of coils arranged to define a plurality of phase windings configured to rotate a rotor with a number of magnetic poles. The stator includes a yoke that includes a back portion and a first type and first quantity of integral teeth. The stator also includes a second type and second quantity of insertable teeth coupled to the back portion. The first type of teeth and the second type of teeth are arranged such that at least one pair of adjacent teeth are of different types and the coils placed around the respective two adjacent teeth belong to the same phase winding.

Other aspects and embodiments of the invention will become apparent by consideration of the detailed description and accompanying drawings.

BRIEF DESCRIPTION OF THE DRAWINGS

The detailed description particularly refers to the accompanying figures in which.

DETAILED DESCRIPTION

Before any embodiments of the invention are explained in detail, it is to be understood that the invention is not limited in its application to the details of construction and the arrangement of components set forth in the following description or illustrated in the following figures. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
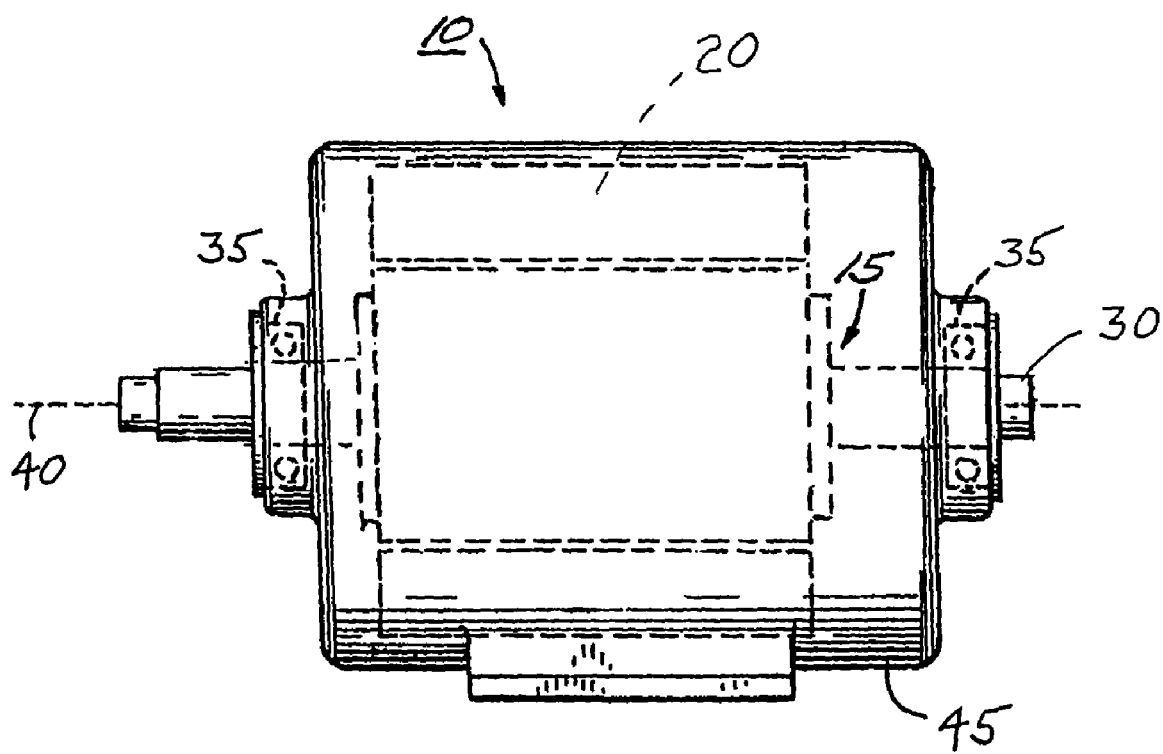
FIG. 1 is an axial schematic view of an electric motor including a stator.

As shown in the FIG. 1 a motor 10 generally includes a rotor 15 disposed within a stator 20. The rotor 15 is mounted on a shaft 30 that extends axially to provide support points and to provide a convenient shaft power take off point. Generally, two or more bearings 35 engage the rotor shaft 30 and support the rotor 15 such that it rotates about a rotational axis 40. The stator 20 is generally fitted into a housing 45. The stator 20 defines a substantially cylindrical aperture, or bore 55 as it is commonly referred to in the motor art, that is centered on the rotational axis 40. When the rotor 15 is in its operating position relative to the stator 20 a small air gap is established between the rotor and the stator. The air gap allows for relatively free rotation of the rotor 15 within the stator 20.

The frame 45, if employed, supports the stator 20. One frame 45, better illustrated in FIG. 11, includes a plurality of empty spaces 46 near the corners. The empty spaces 46 provide cooling passages for cooling air or another cooling fluid. In preferred constructions, the frame 45 includes a plastic material that is injection molded or otherwise formed. In other constructions, an extruded aluminum frame is employed. In still other constructions, other materials and other manufacturing methods may be employed to manufacture the frame 45.

The motor 10 illustrated in FIG. 1 is a brushless permanent magnet (PM) motor. As such, the rotor 15 includes a ferromagnetic core and permanent magnets that define two or more magnetic poles. The stator 20 includes one or more phase windings (shown in FIGS. 2-3) that can be selectively energized to produce a magnetic field. The permanent magnets of the rotor 15 interact with the magnetic field of the stator 20 to produce electromagnetic torque and rotor rotation. As one of ordinary skill will realize, the invention is also suited for other types of motors, in addition to the brushless permanent magnet motors illustrated herein. As such, the invention should not be limited to only these types of motors. Furthermore, one of ordinary skill in the art will realize that the invention can also be applied to many types of generators. The figures depict a motor 10 configuration having the rotor 15 placed interior to the stator 20. However, the invention is also applicable to motor configurations, typically referred to as "inside-out motors," where the rotor is exterior to the stator. In addition, the figures and description presented herein are directed to a stator 20 and/or a motor 10. However, many of the features described and illustrated could be applied to wound rotors. Thus, while the figures and description refer to a brushless motor 10 and/or a stator 20, other applications are possible.

Figure 2:
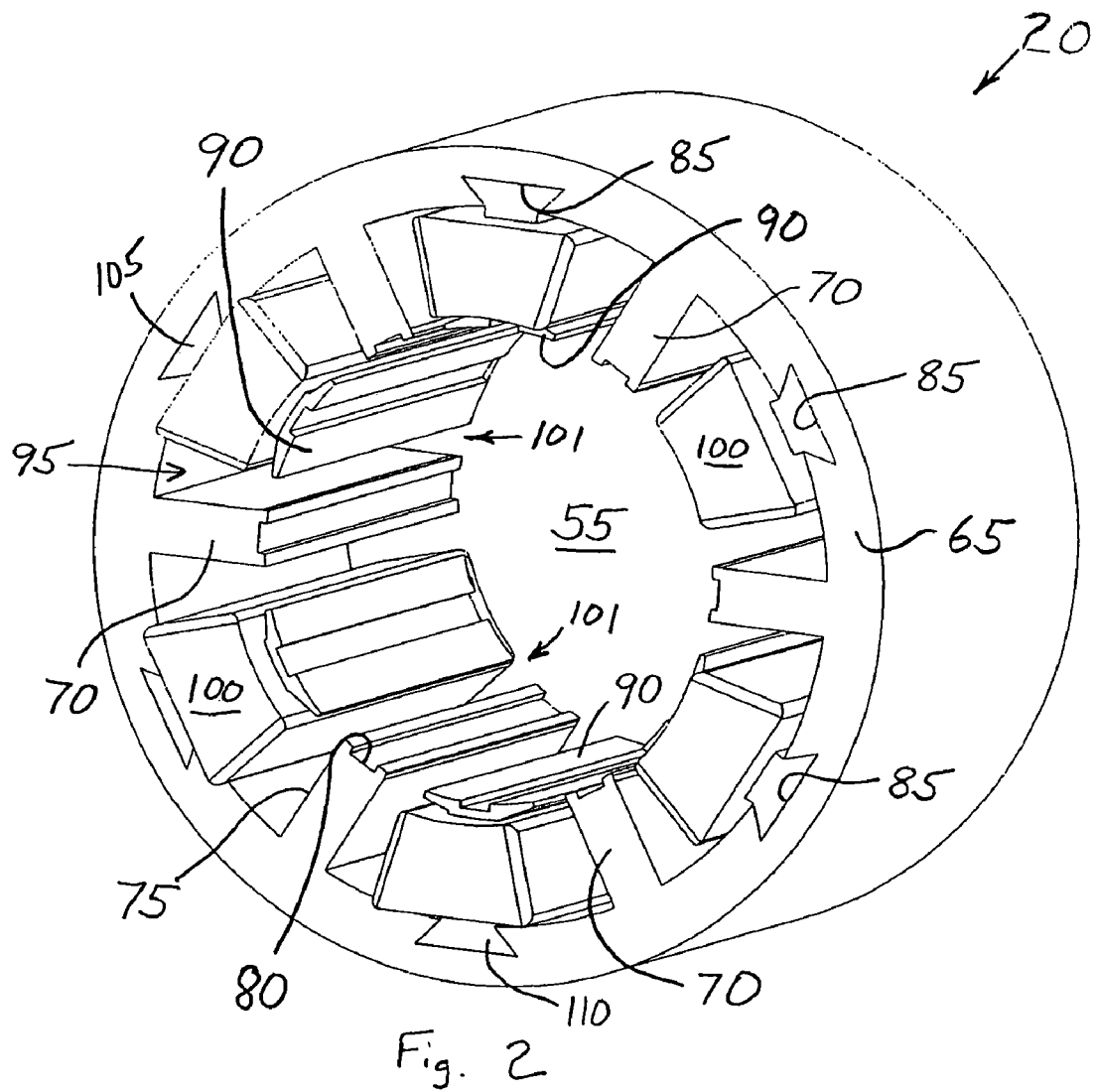
FIG. 2 is a perspective view of a stator including a single-layer winding.
Figure 3:
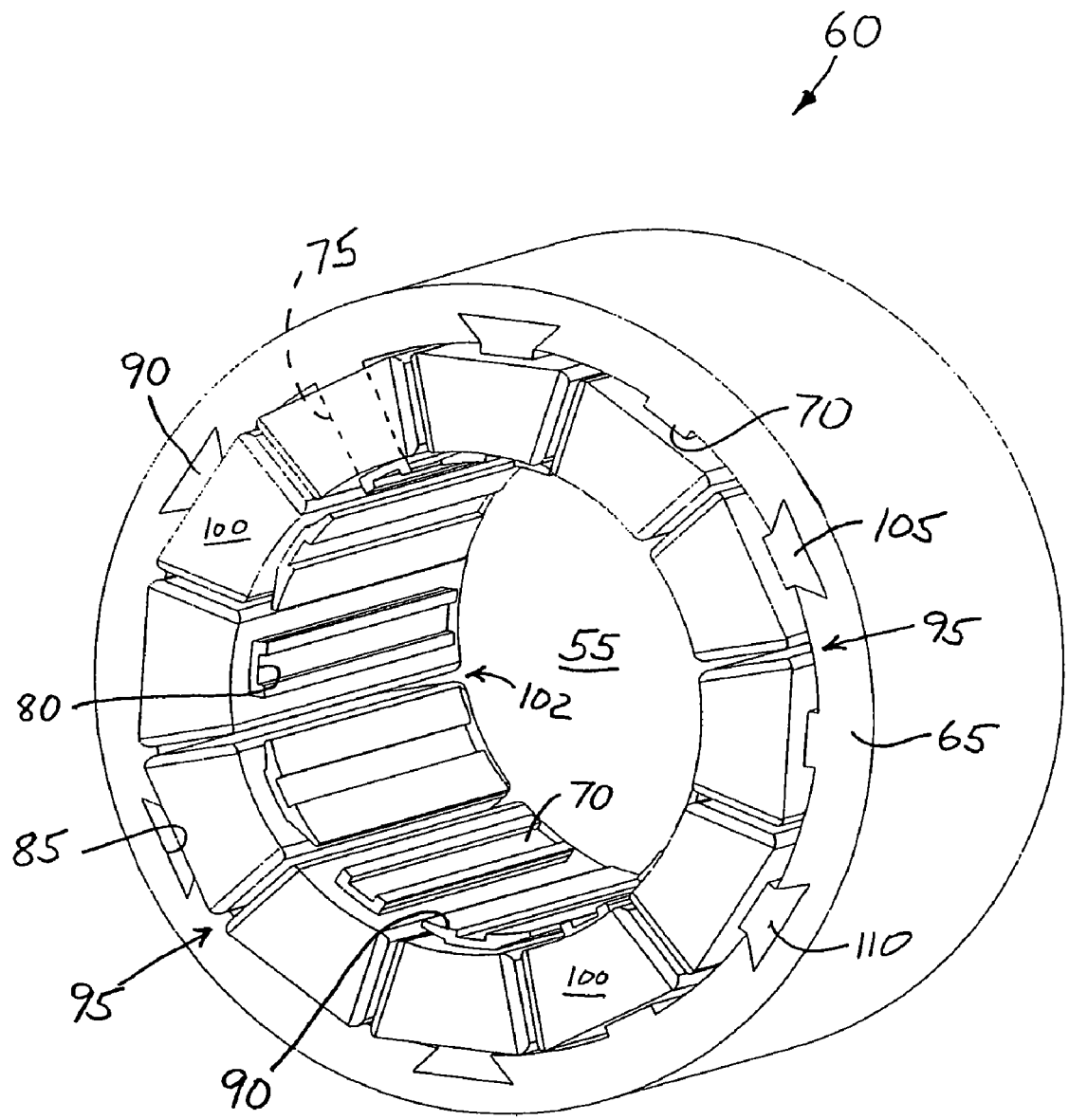
FIG. 3 is a perspective view of a stator including a double-layer winding.

FIGS. 2 and 3 illustrate two possible stators 20, 60 respectively, which are suitable for use with the motor 10 of FIG. 1. Both of the stators 20, 60 include a continuous yoke 65 or back iron that defines the outermost surface of the stator 20, 60. The yoke 65 provides structural support for many of the stator core components and also provides a flow path for the magnetic flux within the stator 20, 60. Several integral teeth 70 extend radially inward from the yoke 65. The teeth 70 include a coil-receiving portion 75 and a tooth base 80 disposed adjacent the cylindrical bore 55. The integral teeth 70 illustrated in FIGS. 2 and 3 are generally straight teeth. In other words, the width of each tooth 70 at the coil-receiving portion 75 is substantially equal to the width of the tooth 70 at the tooth base 80.

The yoke 65 defines several tooth attachment portions 85. Each of the tooth attachment portions 85 is sized and shaped to receive an attachable tooth 90 (shown in FIG. 5). In most constructions, the number of tooth attachment portions 85 equals the number of integral teeth 70. In these constructions, the teeth 70, 90 alternate between an integral tooth 70 and an attachable tooth 90. Thus, the two teeth immediately adjacent any integral tooth 70 are attachable teeth 90 and the two teeth immediately adjacent any attachable tooth 90 are integral teeth 70.

Figure 21:
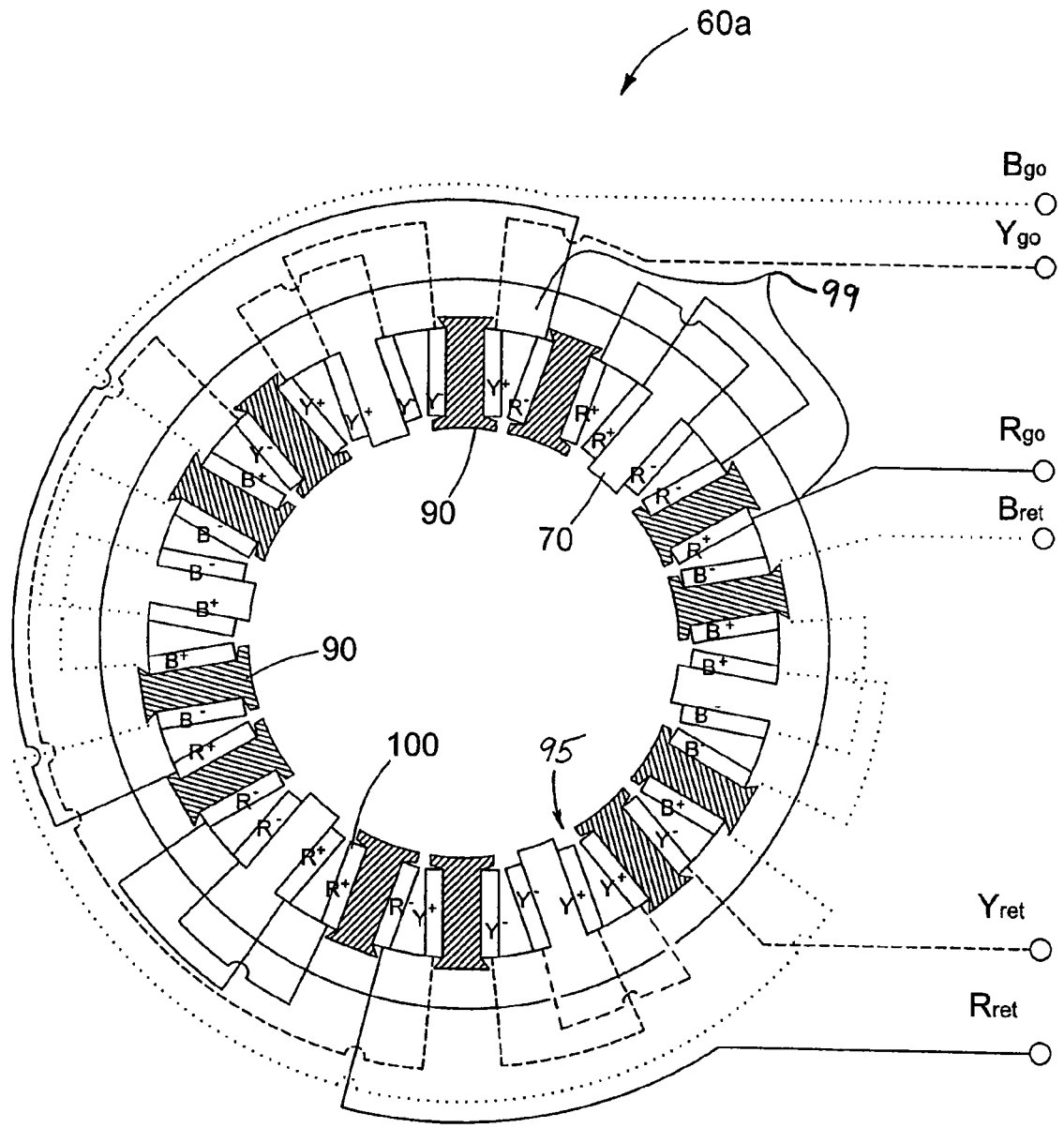
FIG. 21 is a schematic representation of one possible winding diagram of a 3-phase stator with eighteen slots and a double-layer winding.

In other constructions, the tooth pattern may vary such that the integral teeth are not necessarily positioned between attachable teeth. In addition, other combinations of winding diagrams and/or the number of phases and poles can vary. For example, FIG. 21 illustrates a stator 60a for a 3-phase brushless PM motor with eighteen slots 95 and a sixteen pole rotor (not shown). This type of motor is discussed in U.S. Pat. No. 6,133,663 fully incorporated herein by reference. The stator 60a includes one coil 100 around each tooth 70, 90. The coils 100 on three successive teeth are connected within the same phase winding to define a phase group of coils 99. Two such phase groups of coils 99 are diametrically opposed and define a phase winding. The start (go) and the end (return) of the phase windings are denoted by the subscripts "go" and "ret", respectively, and the polarity of the coil sides, which is determined by the direction in which the wire is wound, is denoted by plus (+) and minus (−) signs. In one construction, within a phase group of three coils 99 and teeth, the central tooth is an integral tooth 70 and the two adjacent teeth are attachable teeth 90. Thus, this construction defines a repeating pattern of two attachable teeth 90 followed by an integral tooth 70 around the periphery of the 3-phase stator 60a. Thus, the completed stator 60a includes twice the number of attachable teeth 90 as integral teeth 70. In another construction, the central tooth within a phase group of three coils 99 and teeth is an attachable tooth 90 and the two adjacent teeth are integral teeth 70. Thus, this construction defines a repeating pattern of two integral teeth 70 followed by an attachable tooth 90 around the periphery of the 3-phase stator 60a. Thus, the completed stator includes twice the number of integral teeth 70 as attachable teeth 90. The constructions described minimize the effect of radial forces and can be used without additional devices such as shaft vibration dampers.

The space between any two adjacent teeth 70, 90 defines a slot 95 that is sized to receive one or more sides of coils 100. The coils 100, alone or in combination with other coils 100, define phase windings that can be energized to produce a magnetic field having a desired polarity. The stator 20 of FIG. 2 includes single-layer windings 101. Thus, only a single side of coil 100 is positioned within each of the slots 95. The stator 60 of FIG. 3 includes double-layer windings 102 that include two sides of coils 100 per slot 95.

The coils 100 of FIG. 2 and FIG. 3 include an electrical conductor that is wound around the tooth 70, 90 to which the coil 100 is attached. For coils 100 that attach to attachable teeth 90, the conductor is wound directly onto the tooth 90. An electrical insulator, not shown in the figures, is placed between the electrical conductor of the coil 100 and the tooth 70, 90 to which it is attached. Generally, the winding operation on an attachable tooth 90 can be performed quickly and inexpensively using a bobbin winder as is common in the motor art. The coils 100 that are wound on the integral teeth 70 can be wound directly onto the teeth 70 using a needle winder or other winder suited to the task. Alternatively, the conductor can be wound around a dummy tooth or fixture (not shown) using a less expensive bobbin winder. The coil 100 is then removed from the dummy tooth or fixture and slid onto the integral tooth 70.

Figure 19:
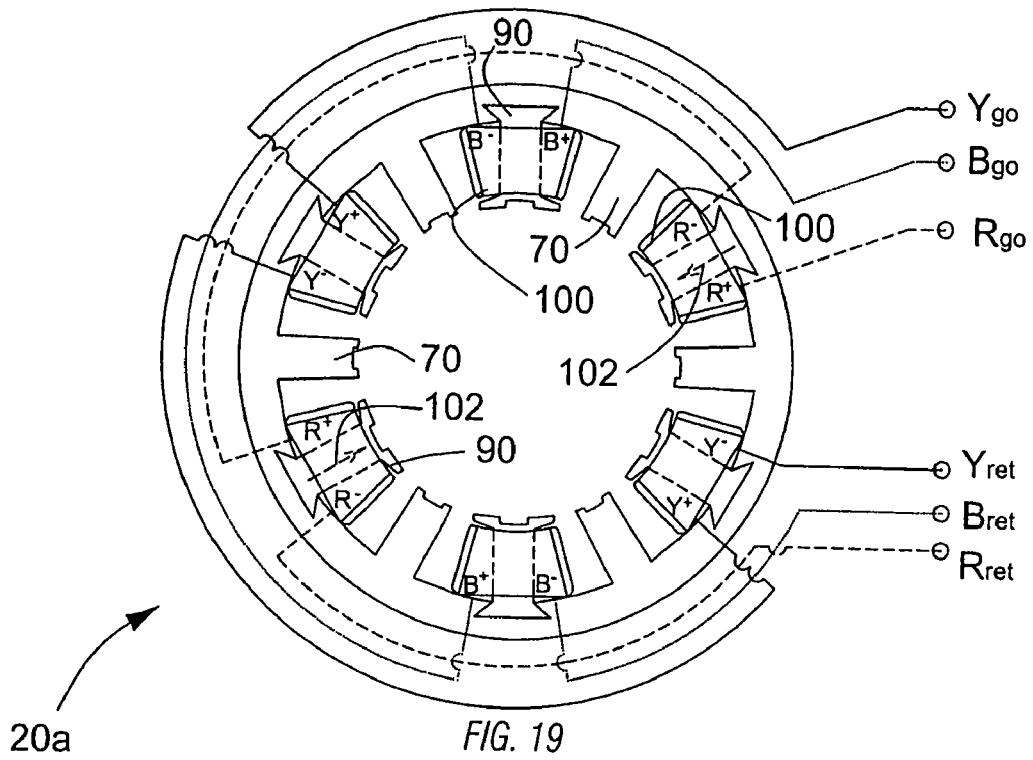
FIG. 19 is a schematic representation of one possible winding diagram of a 3-phase stator with twelve slots and a single-layer winding.
Figure 20:
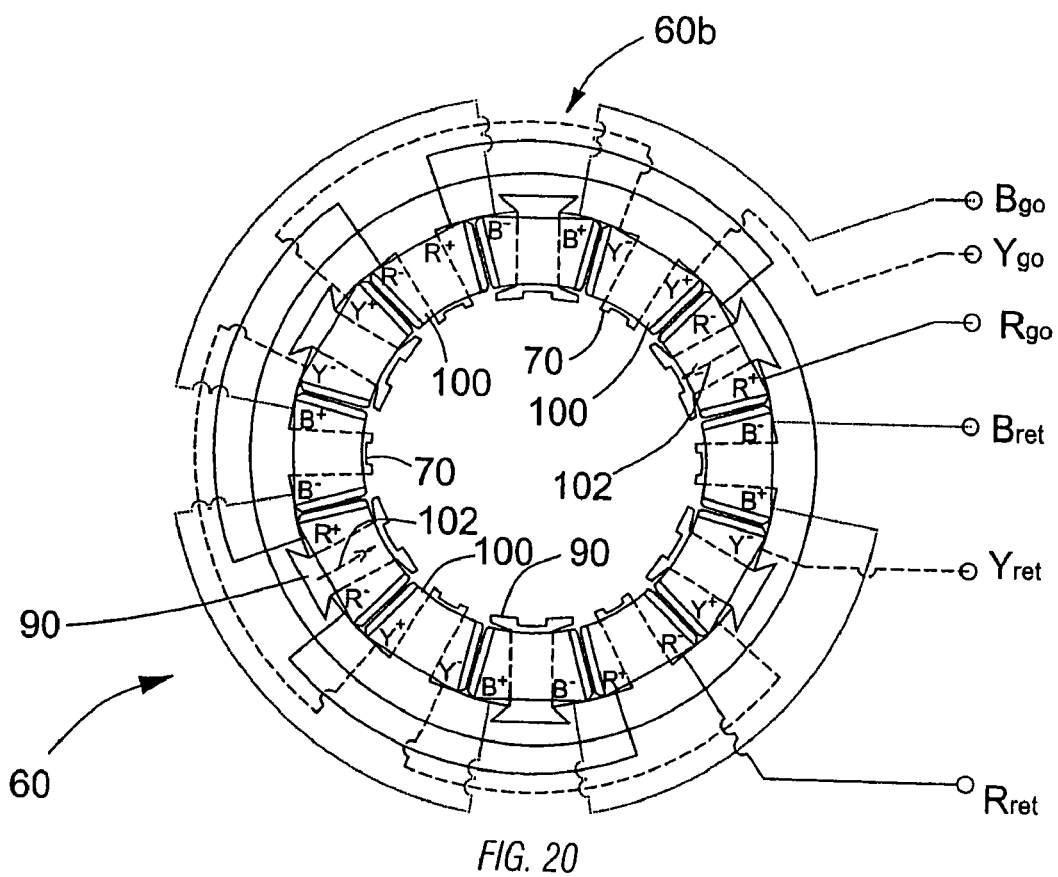
FIG. 20 is a schematic representation of one possible winding diagram of a 3-phase stator with twelve slots and a double-layer winding.

One or more coils 100 are electrically connected to define a phase winding as discussed with regard to FIG. 21. FIGS. 19 and 20 show example winding diagrams that illustrate the coil connections within each phase, for a 3-phase stator with twelve slots. A stator 20a with a single-layer winding as illustrated in FIG. 19 can be used in combination with an eight pole permanent magnet rotor to define a brushless permanent magnet (PM) motor, which can be of the DC or AC type. A stator 60b with a double layer winding as illustrated in FIG. 20 can be used in combination with an eight pole permanent magnet rotor or, alternatively, with a sixteen pole permanent magnet rotor, to define a brushless PM motor, which can be of the DC or AC type.

In a symmetrical multi-phase stator construction, coils placed around the teeth 70, 90 are connected within each phase such that the axes of the phase windings are equidistantly spaced around the stator circumference. To minimize the undesirable radial magnetic forces and magnetic pull, the stator is constructed such that diametrically opposed teeth 70, 90 have the same profile and either carry no coils or carry a coil 100 belonging to the same phase winding. The coil 100 is designed and connected such that when an electric current flows through the wire, the armature reaction magnetic field established in the respective tooth 70, 90 is of equal magnitude and opposite direction to the armature reaction magnetic field established in the diametrically opposite tooth 70, 90. The armature reaction field is schematically represented by an arrow 102 in FIGS. 19-20 for the teeth 70, 90 surrounded by the coils 100 of the phase winding. The stators 20a, 60b shown in FIGS. 19-20 include an alternating pattern of integral teeth 70 and attachable teeth 90, the number of integral teeth 70 and attachable teeth 90 being equal.

The integral teeth 70 are generally straight teeth. As such, each tooth 70 defines a tooth profile that is substantially rectangular that allows coils 100 to slide onto the integral tooth 70. The attachable teeth 90, better illustrated in FIG. 5, include an enlarged tooth base 105 and a tooth top 110 or tooth root. The enlarged tooth base 105 makes the attachable tooth profile different from the integral tooth profile. The enlarged tooth base 105 aids in retaining the coil 100 in the desired position on the tooth 90 and also aids in spreading the magnetic field to reduce motor cogging and torque ripple. The enlarged tooth base 105 also reduces the equivalent magnetic length of the air-gap between the stator 20 and the rotor 15 and hence increases the motor specific torque output. In preferred constructions, the coil-receiving portions 75 of the integral teeth 70 as well as the attachable teeth 90 are of substantially equal width. Thus, identical coils 100, with the same number of turns and wire size, can be wound onto each tooth if desired. Of course, different width coil-receiving portions could be employed if desired. For example, the width of the integral teeth 70 and attachable teeth 90 under the winding portion may vary such that they define a ratio of tooth widths between about 0.75 and 1.25.

Figure 4:
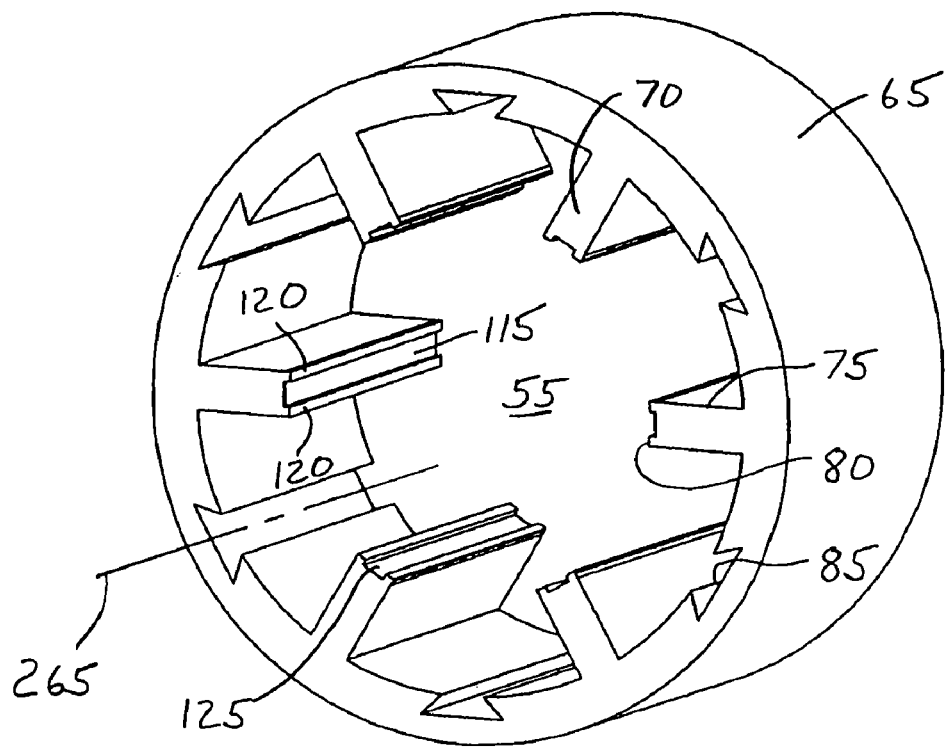
FIG. 4 is a perspective view of a portion of a stator core having attachable teeth.
Figure 5:
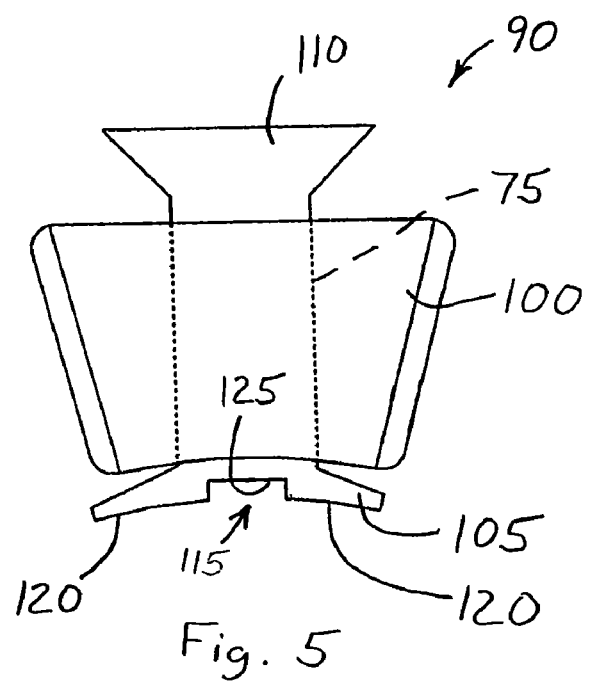
FIG. 5 is an end view of an attachable tooth including a coil.

FIGS. 4 and 5 illustrate one possible configuration of the tooth attachment portions 85 and the tooth tops 110. In this construction, the tooth attachment portions 85 include a recess shaped to resemble a dovetail slot. The tooth tops 110 are shaped to resemble a male dovetail root that can mate with the female dovetail slot defined by the attachment portions 85. To achieve the desired degree of fit, it is generally necessary to provide an interference or shrink fit between the dovetail slot and the dovetail. The tight fit assures good contact between the components and minimizes the magnetomotive force (mmf) drop as the magnetic field crosses the interface between the attachable teeth 90 and the yoke 65.

While a dovetail fit has been illustrated, one of ordinary skill in the art will realize that there are many other fits and configurations that could be used to attach the attachable teeth 90 to the yoke 65. For example, the dovetail fit just described could be reversed such that the male portion of the fit is formed as part of the yoke 65 and the female portion is formed as part of the attachable tooth 90. In still other constructions, different fit shapes are employed. One such shape is illustrated and described with regard to FIGS. 13-14. Still other shapes that could be employed include, but are not limited to, T-roots, fir tree roots, L-roots, and the like. Of course, the male portion of any of these roots could be positioned on either the yoke 65 or the attachable tooth 90 as desired.

Figure 6:
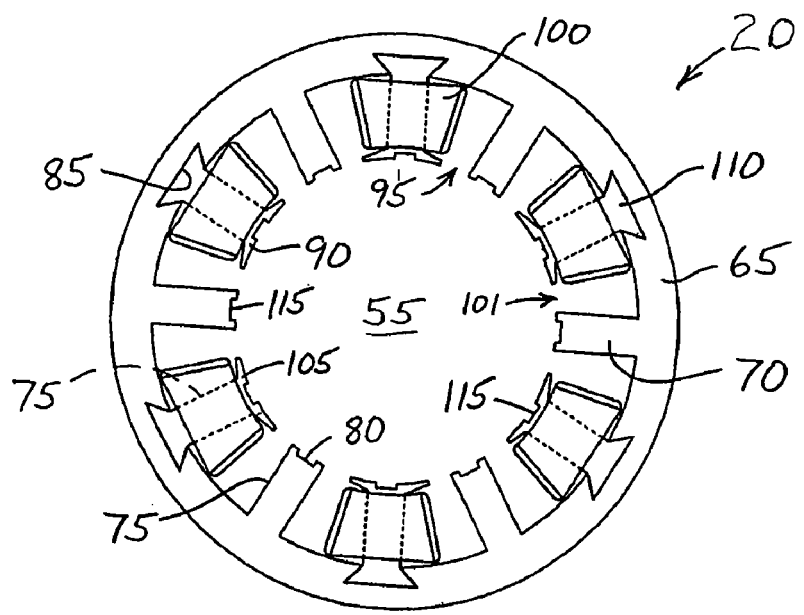
FIG. 6 is an end view of the stator of FIG. 2.
Figure 7:
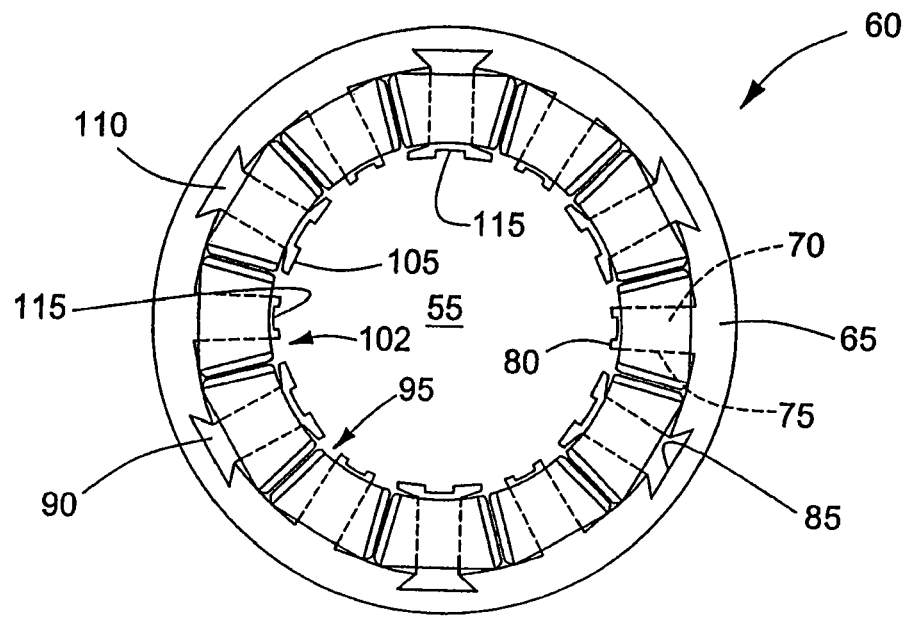
FIG. 7 is an end view of the stator of FIG. 3.

As illustrated in FIGS. 6 and 7, each of the integral teeth 70 and attachable teeth 90 includes at least one dummy groove 115 in the surface adjacent the stator bore 55. The dummy grooves 115 divide the teeth 70, 90 into alternating high spots 120 and low spots 125 (shown in FIGS. 8 and 9). With a single dummy groove 115, each tooth 70, 90 is divided into two high spots 120 and one low spot 125. Thus, a castellated pattern is established around the perimeter of the stator bore 55 and the magnetic permeance of the air-gap is modified such as to effectively reduce cogging, torque ripple, and electromagnetic noise.

Figure 8:
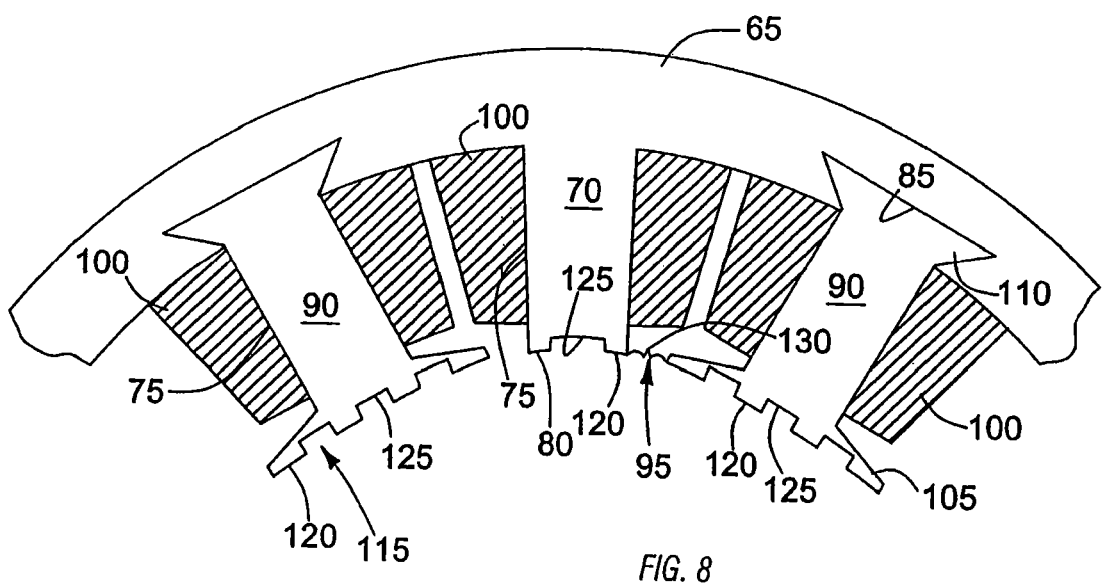
FIG. 8 is a cross-sectional view of a portion of a stator of the type shown in FIG. 7.

FIG. 8 illustrates another construction in which each integral tooth 70 includes a single dummy groove 115 and each attachable tooth 90 includes three dummy grooves 115. Thus, the integral teeth 70 define two high spots 120 and one low spot 125, while the attachable teeth 90 define four high spots 120 and three low spots 125. Each slot opening 130 between adjacent teeth 70, 90 functions effectively as a low spot 125. Thus, a consistent pattern of substantially equal circumferential length alternating high spots 120 and low spots 125 extends around the perimeter of the stator bore 55. This arrangement produces relatively smooth rotor operation and further reduces cogging and torque ripple when compared to the constructions of FIGS. 6 and 7. The total number of high spots 120 and low spots 125 is selected in relationship with the motor polarity, number of slots and windings, and rotor to stator axial magnetic skew. Non-uniform spatial distributions of the high spots 120 and low spots 125 around the stator bore 55 are also possible, so that, under the local non-linear magnetic saturation of the tooth tops 110, the magnetic field is distributed as to improve motor performance.

The wide tooth base 105 of the attachable teeth 90 reduces the width of the slot opening 130 and spreads the magnetic field towards the motor air-gap. Again, this can improve motor operation, by reducing electromagnetic noise, cogging, and torque ripple as well as increasing motor specific output torque. Also, the use of attachable teeth 90 facilitates winding with a very high copper fill factor so that the space in a slot 95 between two adjacent coils 100 of a double-layer winding 102 (FIG. 8) or, in the case of single-layer windings 101 (FIG. 6), the space between the coil 100 and an integral tooth 70 (FIGS. 15-16) is reduced. The high fill factor results in reduced winding resistance and copper losses and hence increased motor efficiency.

Figure 9:
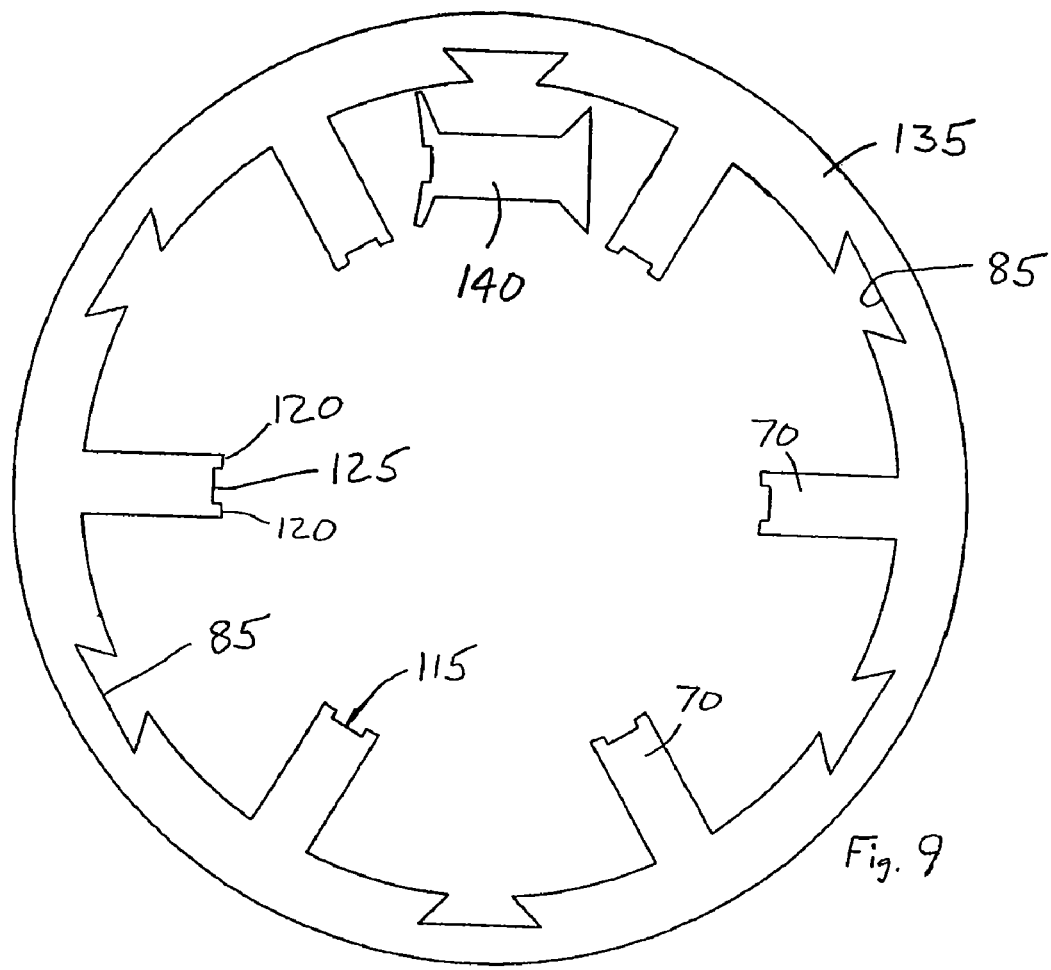
FIG. 9 is an end view of a stamping arrangement for a stator lamination and a tooth lamination.

In most constructions, stacking a plurality of laminations 135 forms the yoke 65, including the integral teeth 70 and the tooth attachment portions 85. The laminations 135 are generally stamped from electrical grade steel. Similarly, stacking a plurality of tooth laminations 140 generally forms the attachable teeth 90. FIG. 9 illustrates one possible layout arrangement for a stamping that includes both a yoke lamination 135 and an attachable tooth lamination 140. The attachable tooth lamination 140 is positioned within the space between adjacent integral teeth 70 and does not extend beyond the stator inner diameter. The center portion of the stamping is also used for any rotor core laminations that may be needed. Thus, the arrangement of FIG. 9 reduces the amount of waste material and reduces the number of manufacturing steps needed to form the laminations 135, 140. As one of ordinary skill will realize, FIG. 9 illustrates only one attachable tooth lamination 140. However, it should be understood that an attachable tooth lamination 140 could be punched from the space between any two adjacent integral teeth 70. It should also be noted that the manufacturing process has been described as including a punching operation. However, one of ordinary skill will realize that other manufacturing processes could be employed to cut the laminations (e.g., laser cutting, wire EDM, water-jet cutting, and the like).

In other constructions, a single piece of material forms the yoke 65, integral teeth 70 and tooth attachment areas 85. In these constructions, a compacting and/or sintering process or other suitable process is used to form a compacted powder of ferromagnetic steel or soft magnetic composites into the desired component. In addition, other constructions may include attachable teeth 90 formed from one piece of material such as compacted powder of ferromagnetic steel or soft magnetic composites.

The use of attachable teeth 90 also allows for stators 20, 60 that include a yoke 65 and integral teeth 70 manufactured from one material (e.g., laminated electric steel, powdered metal, soft magnetic composites, solid metal, etc.) and attachable teeth 90 made from the same material, or a different material. For example, one construction may include a yoke 65 and integral teeth 70 made from laminations of electric steel, and attachable teeth 90 made from a soft magnetic composite. The different materials provide different electrical and magnetic characteristics that may be used to improve the particular performance characteristics of the motor 10.

Figure 10:
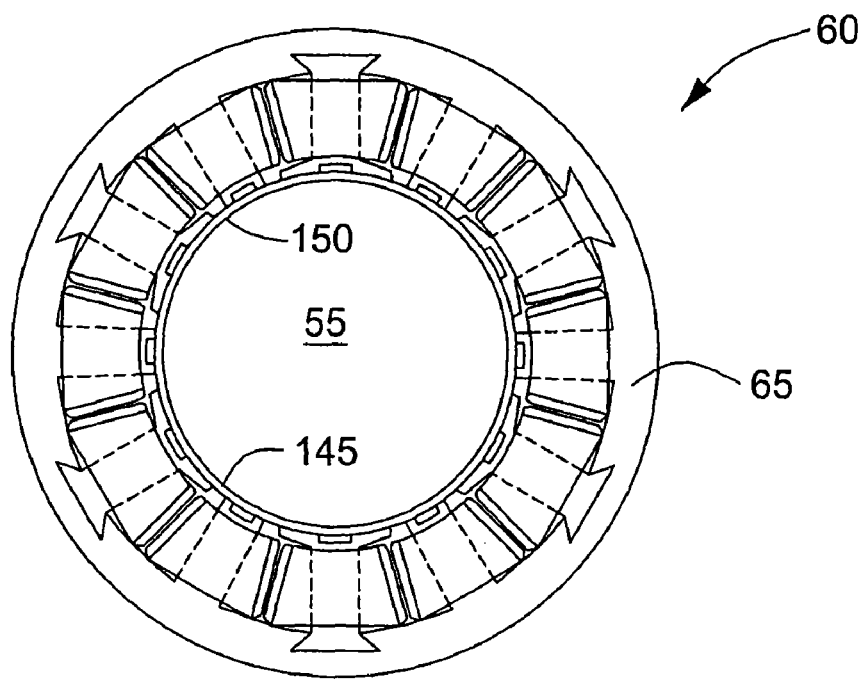
FIG. 10 is an end view of the stator of FIG. 3 including an inner liner.

FIG. 10 illustrates a stator 60 that includes an inner liner 145 or can. The inner liner 145 is a substantially cylindrical component that fits within the stator bore 55 and contacts the tooth bases of the teeth 70, 90. The liner 145 includes a central opening 150 that allows for the free passage of the rotor 15. The liner can be made of a non-magnetic material, such as plastic or stainless steel. In other constructions, the liner can be made of ferromagnetic material, such as magnetic steel, and designed such that the local saturation caused by the magnetic field will reduce the cogging and ripple torque and/or improve the specific torque output. In some constructions, the liner 145 may provide additional structural support to the stator 20 by at least partially supporting the attachable teeth 90. In addition, the liner 145 substantially separates the components of the stator 20 from those of the rotor 15. This can be useful in hermetically sealed motor applications or other applications where dirt or other undesirable substances can enter the stator 20 via the stator bore 55.

The liner 145 illustrated in FIG. 10 is substantially tubular. As such, the perimeters of the inner surface and the outer surfaces are substantially circular. The tubular shape does not allow the liner 145 to engage the teeth 70, 90 in any way other than friction between the teeth 70, 90 and the liner 145. As such, the liner 145 only applies radial forces to the teeth 70, 90. While the inner liner 145 is illustrated on a stator 60 having a double-layer winding 102, it is equally applicable to stators 20 that employ single-layer windings 101.

Figure 11:
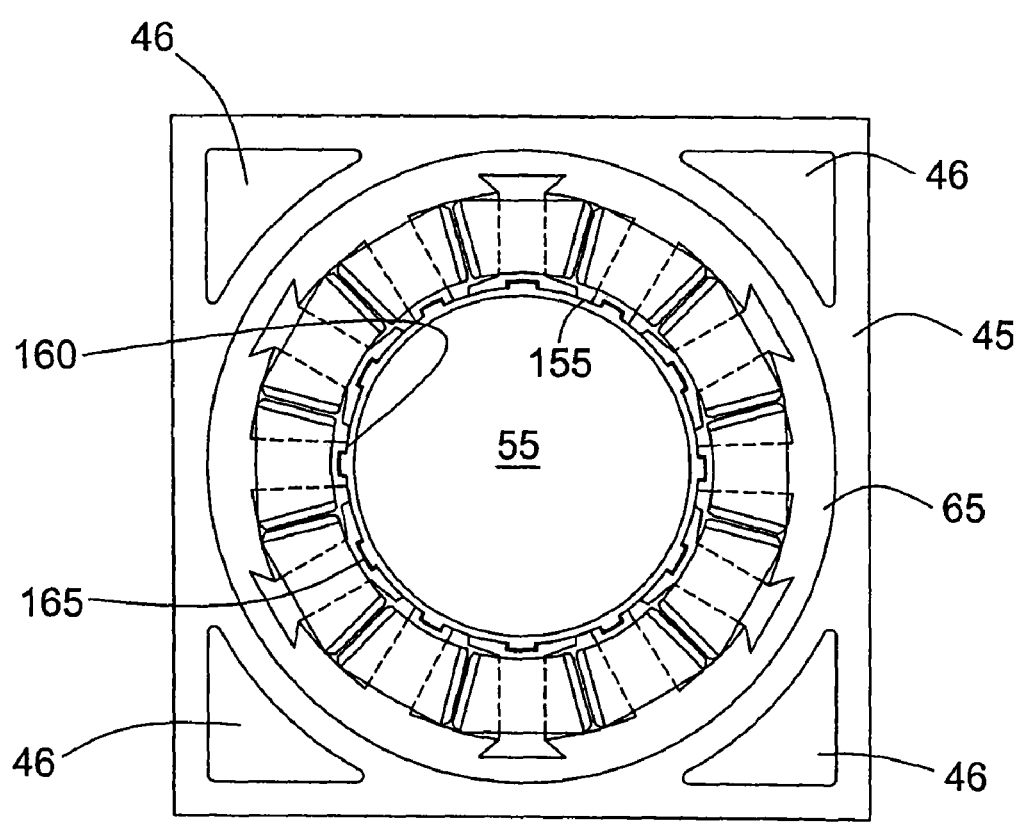
FIG. 11 is an end view of the stator of FIG. 3 including a castellated inner liner or can.

FIG. 11 illustrates a castellated liner 155 or can disposed within a stator 60 having a double-layer winding 102. The castellated liner 155 includes alternating high spots 160 and low spots 165 that correspond with the alternating high spots 120 and low spots 125 in the teeth 70, 90. The alternating high spots 160 and low spots 165 interlock with the corresponding high spots 120 and low spots 125 of the teeth 70, 90 such that the castellated liner 155 may provide structural support to the attachable teeth 90 in directions other than radial. Thus, the castellated liner 155 aids in maintaining the spacing between the teeth 70, 90 by locking each tooth 70, 90 into a particular location defined by the liner 155. Like the tubular liner 145, the castellated liner 155 can be used on stators 20 that include either single-layer windings 101 or double-layer windings 102. It should be noted that the castellated liner 155 is illustrated as having a smooth or cylindrical inner surface. However, other constructions may include a castellated liner 155 that includes a castellated inner surface that corresponds with the outer surface. The actual arrangement of the inner surface is of little importance to the function of the motor.

Figure 12:
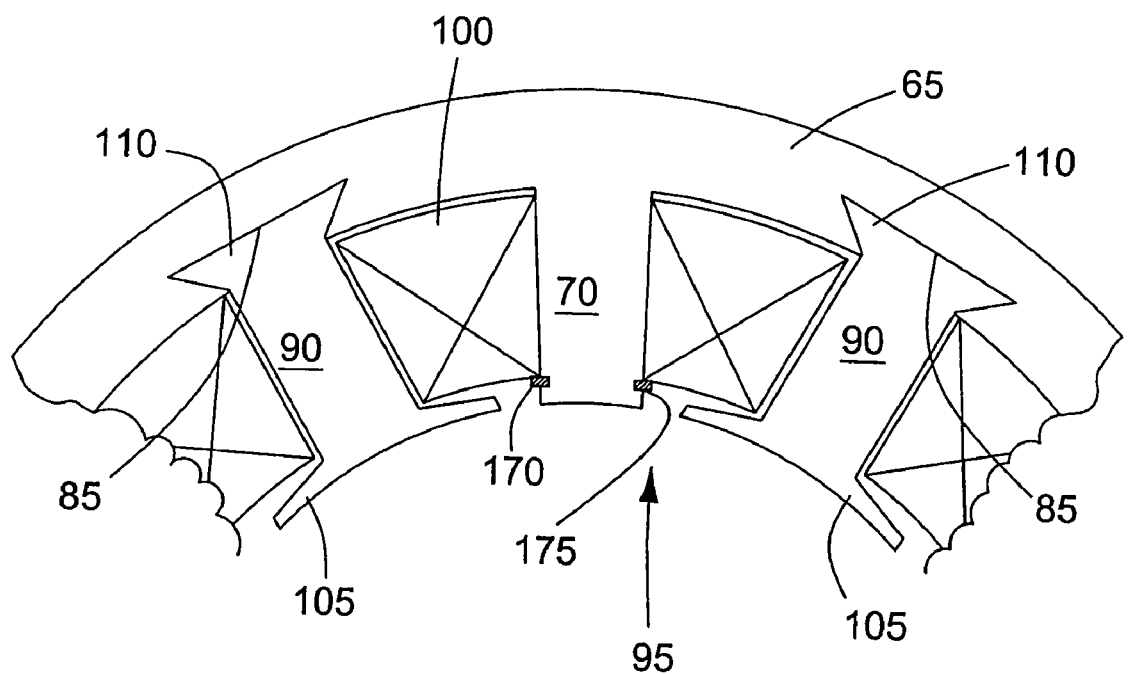
FIG. 12 is a cross-sectional view of a portion of a stator including a coil retaining clip.

As discussed with regard to FIGS. 2 and 3, the coils 100 that surround the integral teeth 70 can preferably be wound onto a dummy tooth or other fixture, or on a bobbin support made of electrically-insulating material and then slid onto the actual integral tooth 70. While many different systems can be used to secure the coil 100 to the tooth 70 (e.g., adhesive, epoxy, injection-molded plastic, and the like), FIG. 12 illustrates a construction that employs a retaining clip 170. The clip 170 engages a small slot 175 that is formed in the tooth 70 to inhibit movement of the coil 100, which is sandwiched between the clip 170 and the yoke 65. Generally, the clip 170 is manufactured from a relatively stiff material such as spring steel such that it remains in the slot 175 during motor operation. In other constructions, other mechanical means such as fiberglass wedges, pins, screws, bolts, and the like are used to hold the coil 100 in the desired operating position.

In another construction, after completely assembling all the coils 100, plastic, thermoplastic resin, epoxy, or other suitable material is injected into the spaces between the teeth 70, 90. This injected material aids in holding the coils 100 in their operating positions and can also facilitate heat transfer from the tooth areas of the stator 20 to the yoke 65. In addition, the injected material fills the empty spaces, thus making it more difficult for dirt or other unwanted components to enter and damage the stator 20. This construction can also include, as a permanent attachment or as a temporary fixture for the injection operation, an inner liner 145 or a castellated liner 155.

Figure 13:
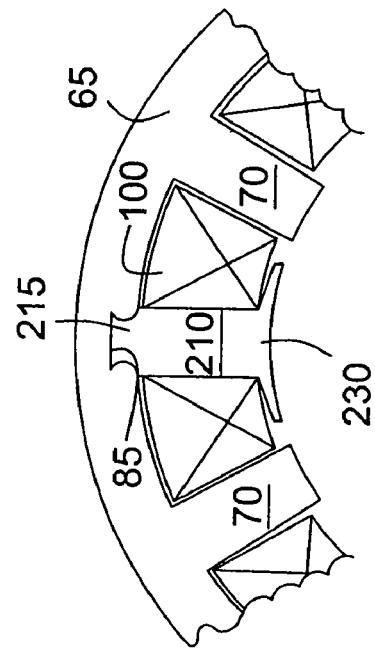
FIG. 13 is a cross-sectional view of a portion of a stator including a straight tooth and a small width root.
Figure 15:
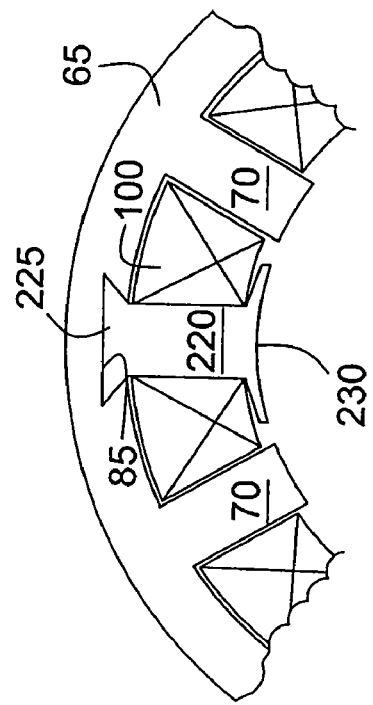
FIG. 15 is a cross-sectional view of a portion of a stator including a straight tooth and a dovetail root.
Figure 16:
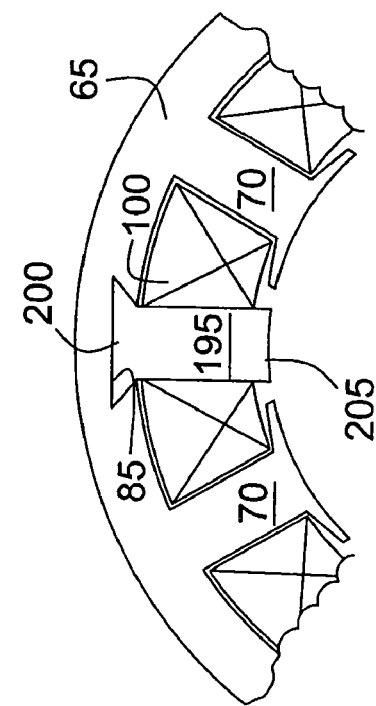
FIG. 16 is a cross-sectional view of a portion of a stator including a tooth base and a dovetail root.

FIGS. 13-16 illustrate several arrangements of attachable teeth positioned within the stator 20 that includes the single-layer winding 101. FIG. 13 illustrates a tooth 180 that includes a narrow tooth top 185 engaged with the stator yoke 65 and a narrow tooth base 190 adjacent the stator bore 55. FIG. 15 illustrates another tooth 195 that includes a wide tooth top 200 that engages the yoke 65 and a narrow tooth base 205. Due to the specific magnetic flux pattern during motor operation, the constructions of FIGS. 13 and 15 can be manufactured using separated teeth laminations punched out of anisotropic magnetic material with the tooth 180, 195 oriented along the preferred magnetization (or the "easy" rolling) direction. One possible magnetic material would be electric lamination steel with an oriented grain, which is commonly employed in the manufacture of the magnetic circuit of transformers. This choice of material reduces the magnetic circuit reluctance and the iron losses and improves motor performance. No dummy notches are shown in FIGS. 13-16, but it is understood that, if desired they can be employed similarly to the constructions shown in FIG. 8.

Figure 14:
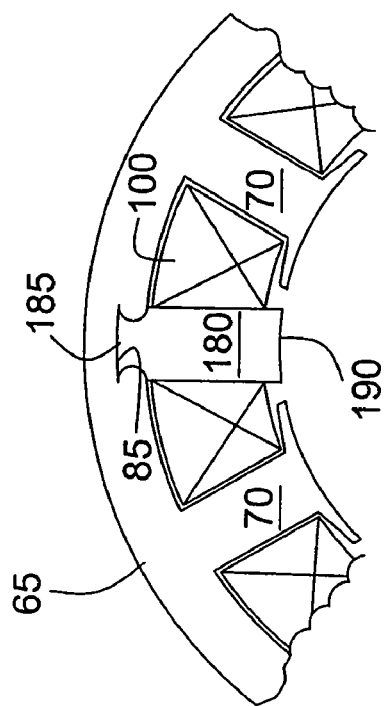
FIG. 14 is a cross-sectional view of a portion of a stator including a tooth base and a small width root.

The tooth 210 illustrated in FIG. 14 includes a tooth top 215 that is similar to the tooth top 185 of FIG. 13. The tooth 220 illustrated in FIG. 16 includes a tooth top 225 that is similar to the tooth top 200 of FIG. 15. However, the attachable teeth 210, 220 of FIGS. 14 and 16 include an enlarged tooth base 230 when compared to the attachable teeth 180, 195 of FIGS. 13 and 15. The constructions with an enlarged tooth base 230, due to their specific magnetic flux pattern during motor operation, are best suited for use with isotropic non-grain oriented magnetic material (e.g. the electric steel commonly employed in the manufacture of the magnetic circuit of rotating electrical machines). Therefore, these constructions can not take advantage of the benefits provided by the use of an anisotropic grain oriented magnetic material. Furthermore, the construction of FIG. 14 has the disadvantage that the tooth 210 has to support, through the base 230, the weight of the coil 100, while the profile of the tooth top 215 does not provide enhanced mechanical support, as does for example the profile of the tooth top 225 in the construction of FIG. 16. On the other hand, in comparison with the construction of FIG. 14, the construction of FIG. 16 has the disadvantage that the coil 100 needs to be wound directly on the tooth 220, using more expensive winding equipment.

Figure 17:
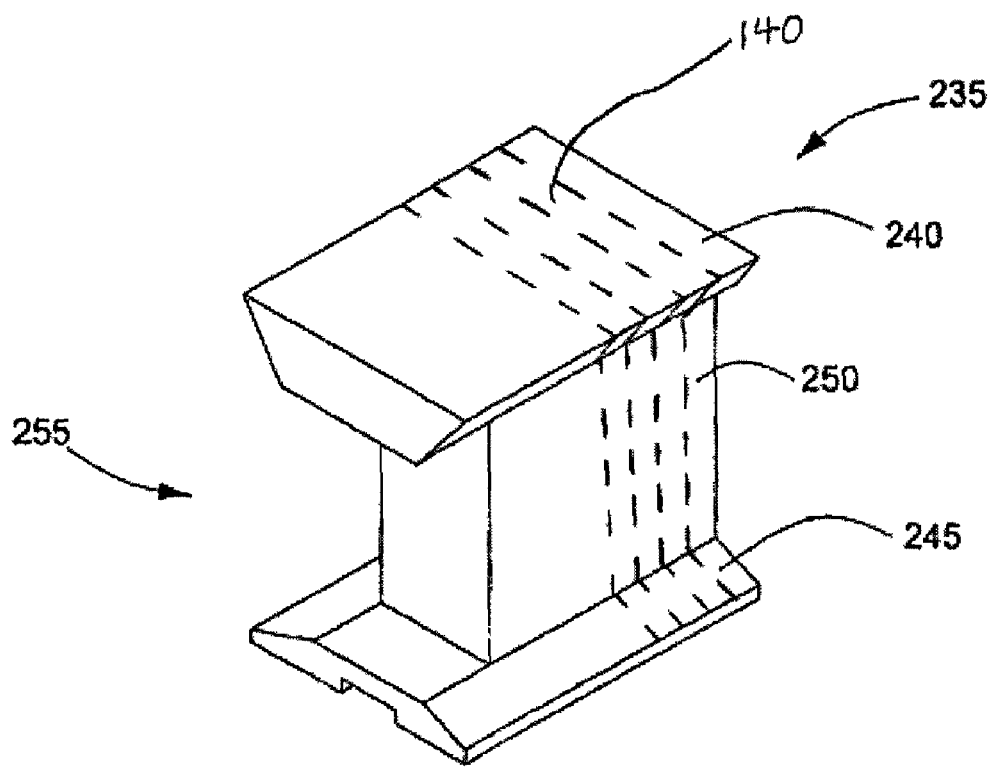
FIG. 17 is a perspective view of an attachable tooth including a coil-receiving recess.
Figure 18:
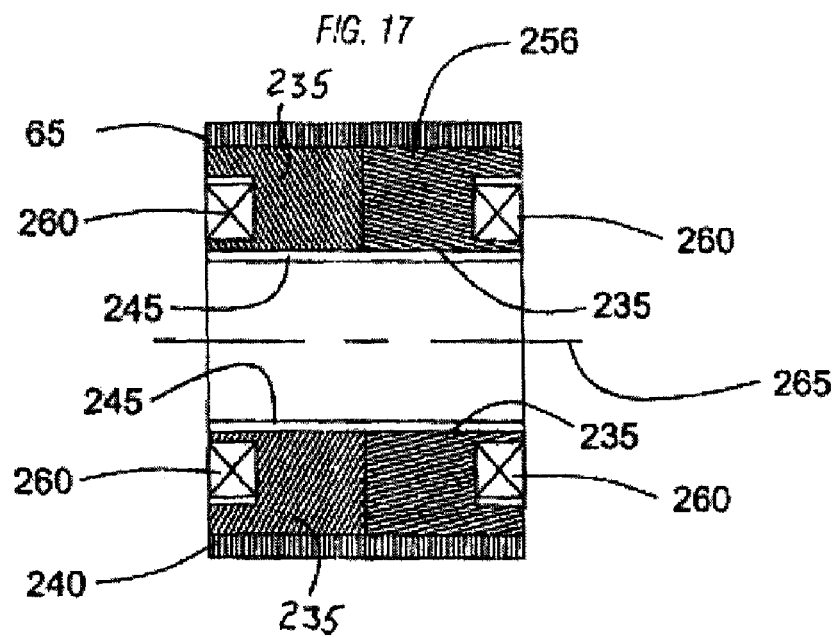
FIG. 18 is a cross-sectional view of a stator including the attachable tooth of FIG. 17.

Another construction of a portion of an attachable tooth 235 is illustrated in FIGS. 17 and 18. The portion of the tooth 235 includes a tooth top 240, a tooth base 245, and a coil-receiving portion 250. The portion of the tooth 235 also includes a recess portion 255 adjacent one end of the portion of the tooth 235. In many constructions, stacking a plurality of laminations 140 on top of one another and bonding or otherwise attaching them forms the portion of the tooth 235. In other constructions, compacted powder of ferromagnetic steel, soft magnetic composites, or other materials are used to form the portion of the tooth 235. In constructions formed from laminations, a first group of laminations having a first profile are stacked to define the portion of the tooth 235 that includes the tooth top 240, the tooth base 245, and the coil-receiving portion 250. Once the coil-receiving portion 250 is complete, laminations having a tooth top profile and a tooth base profile are added to complete the tooth 235. FIG. 17 illustrates laminations 140 with broken lines indicating the interface between adjacent laminations 140. In laminated constructions, the broken lines would represent the interface between adjacent laminations 140, while in powdered metal constructions, no laminations and therefore no interfaces exist and the broken lines could be omitted.

Two portions of an attachable tooth 235 are attached to one another to complete a tooth 256. In one construction, an adhesive is used to attach the two halves of the tooth 235 and complete the tooth 256. In other constructions, fasteners, pins, or other attachment means are used to attach the two halves of the tooth 235 to complete the attachable tooth 256.

While the construction illustrated in FIG. 17 includes two halves 235 with each including one recess 255 at one end of the tooth half 235, other constructions may include a recess 255 at both ends of a single tooth. The recess 255, or recesses, provides a space for an end coil 260 as illustrated in FIG. 18. Thus, with the coil 100 positioned around the tooth 235, the end coils 260 do not extend significantly beyond the ends the tooth top 240 or the tooth base 245.

The construction of FIGS. 17 and 18 has several advantages over current motor constructions. For example, the recesses 255 in the teeth 235 provide space for the end coils 260 and the tooth base 245 enhances the axial coverage of the rotor by the stator 20, resulting in a more compact motor having a higher power output per unit length than prior motors. In addition, heat from the end coils 260 is more easily transferred to the yoke 65 and dissipated.

To assemble the stator 20 of the motor 10, the laminations 135, 140 that make up the various core components are first formed. As discussed with regard to FIG. 9, stamped laminations 135, 140 are one way of forming the yoke laminations 135 and the attachable tooth laminations 140 simultaneously, with other methods being possible. The yoke laminations 135 are stacked on top of one another until the stack reaches a desired axial length. In some constructions, additional laminations, or end pieces (not shown) are positioned on the ends of the stack to complete the yoke 65 and/or the integral teeth 70. In constructions that employ end pieces, the end pieces are generally of a different profile than the laminations 135 and provide additional structural strength. Like the yoke laminations 135, the tooth laminations 140 are also stacked and bonded to one another. Once stacked, the laminations 140 define one or more attachable teeth 90.

In constructions in which a double-layer winding 102 is desired, a conductor is wound around the required integral teeth 70 to define a coil 100. As discussed, a winding process (e.g., needle winder) that is well known in the motor art may be used for this purpose. Preferably, the coil 100 is wound on a fixture, a dummy tooth, or on a bobbin support and then slid onto the integral tooth 70. This process allows for the use of a bobbin winder or other winder, rather than a needle winder. A coil 100 is also wound around the attachable teeth 90. Again, a bobbin winder is well suited to this task. In stator constructions that employ a single-layer winding 101, the coil 100 can be positioned on only the integral teeth 70, only the attachable teeth 90, or a combination of integral and attachable teeth 70, 90 as is required by the particular application.

The attachable teeth 90 are positioned within the yoke 65 by interlocking the tooth attachment portion or tooth top 110 and the tooth attachment portion 85. The teeth 90 engage the yoke 65 by sliding axially along an axis 265 that is substantially parallel to the rotation axis 40 of the motor 10. To achieve the desired level of contact, it may be necessary to establish an interference fit. Thus, the assembly process may include differential heating and/or cooling of the yoke 65 and tooth 90. For example, in one construction, the yoke 65 is heated to a temperature that is 200 degrees F. higher than the tooth 90. This can be accomplished by heating the yoke 65 alone, or by heating the yoke 65 and cooling the tooth 90. The differential heating causes expansion of the tooth attachment portion 85 and, if cooling is used, shrinkage of the tooth top 110. Once the tooth 90 is positioned as desired, the temperatures of the components equalize and a tight shrink fit is established. In some constructions, the end plates are positioned after the attachable teeth 90 are in place. In these constructions, the end plates may partially or totally cover the tooth attachment portion 85 and the tooth tops 110 to inhibit unwanted axial movement of the attachable teeth 90 relative to the yoke 65.

If used, the inner liner 145 or 155 is next positioned within the stator bore 55 and positioned as desired relative to the teeth 70, 90. Once installed, plastic, epoxy, resin, or other fill materials can be injected into the spaces between the teeth 70, 90 to better secure the teeth 70, 90 and inhibit the entry of undesirable substances into the stator 20.

The order of operations for manufacturing the stator 20 can vary depending on specific motor design particularities. For example, a motor design with very small slot openings 130, which are not size limited in relation to the width of the coils 100 and of the teeth 70 and 90, can be produced by first attaching coils 100 to the integral teeth 70 and then attaching the attachable teeth 90 including their coils 100 to the yoke 65.

Figure 22:
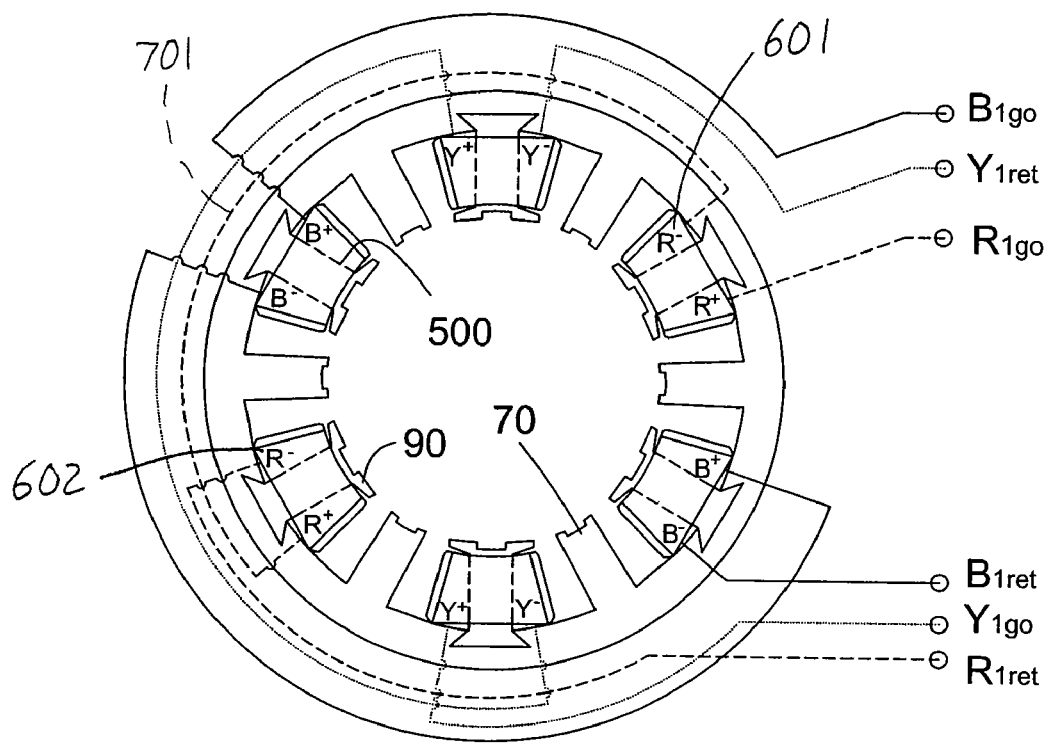
FIG. 22 is a schematic representation of one possible winding diagram for a multi-phase motor.
Figure 23:
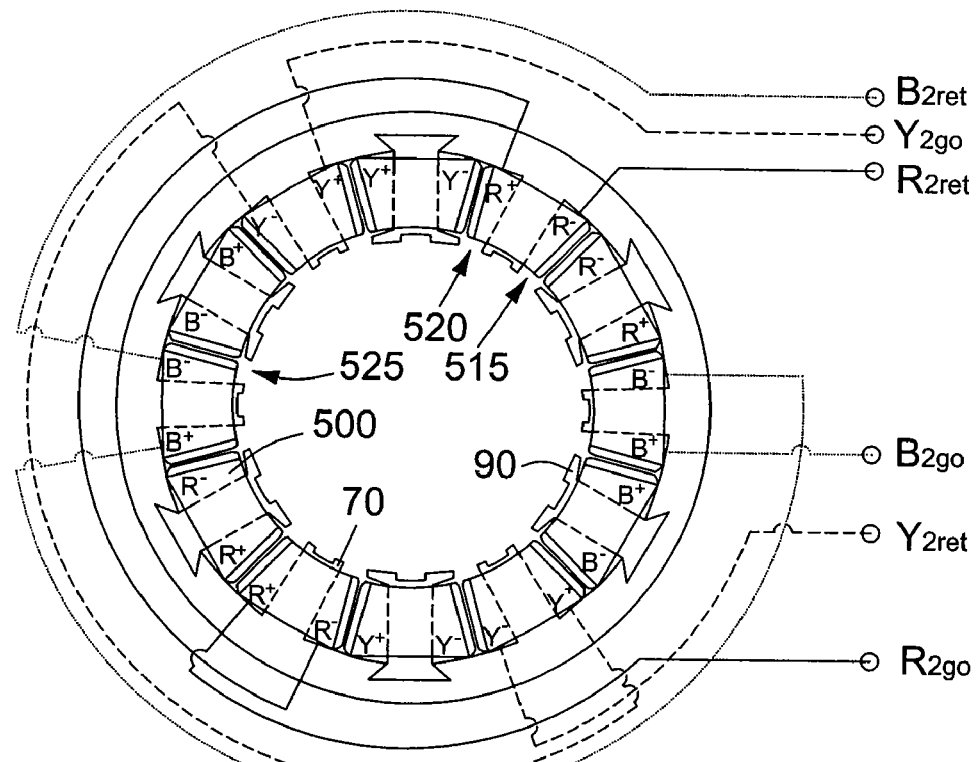
FIG. 23 is a schematic representation of another possible winding diagram for a multi-phase motor.

The concepts discussed with reference to FIGS. 19-21 can be employed to produce stators with different combinations of teeth and winding patterns, which are suitable for interaction with rotors of different magnetic polarity. For example, FIGS. 22-23 are winding diagrams for a poly-phase (three-phase) winding with each phase including multiple coil sections (two in FIG. 22). One or more coils 500 are electrically connected to define a winding section of a phase winding. In preferred constructions, the coils 500 from one winding section are connected through at least one continuous electric wire, which is also wound to produce the coils 500. For example, in FIG. 22, the two coils 601 and 602 define one winding section of the red (R) phase which are wound and connected with the electric wire 701. Other types of connections, known to those skilled in the art, such as wire soldering or wire connection through an electrical connector can also be employed if desired.

FIG. 22 illustrates the winding sections, one per each phase, associated with the coils 500 that are wound (placed) around the insertable (attachable) teeth 90. FIG. 23 shows all the coils 500 of the winding and only the connections for the winding sections associated with the coils attached (inserted on) to the integral teeth 70. The connections for the other winding sections are shown in FIG. 22. Some of the slots 515 include two sharing coil sides that belong to different coil sections. Some of the slots 520 include coils that are part of different phase windings, while other slots 525 include coils that are part of the same phase winding. In the slots in which the coils 500 are part of the same phase winding, the two coil sides have the same polarity. The described winding arrangement is preferable, as the coils 500 are grouped corresponding to their manufacturing technology and the connections within a winding section are simplified. Before connection to a power supply, the terminals of the phase winding sections may be interconnected. For example, for a series connection per phase, terminal R1go is connected to one of the power supply terminals, terminal R1ret is connected to terminal R2go and terminal R2ret is connected to another terminal of the power supply.

A three-phase stator as that exemplified in FIGS. 22-23 can be used in cooperation with a PM rotor to define a brushless PM motor. The polarity of a brushless PM motor is determined by the magnetic polarity of the rotor. Ten-pole rotors, as well as fourteen-pole rotors are suitable for operation with a 12-tooth stator core with the winding pattern of FIG. 23. The total number of stator teeth (integral plus insertable) is equal to the number of rotor magnetic poles plus two and the number of rotor magnetic poles minus two, respectively. Other combinations of stator and rotor polarities, known to those skilled in the art, such as the number of stator teeth being equal to the rotor polarity plus or minus one, are also possible. For the stators shown in FIGS. 19-20 possible rotor polarities are eight and sixteen, so that the total number of teeth (integral plus insertable) is equal to the number of poles times the number of phases and divided by two and four, respectively.

A stator with insertable teeth 90 and integral teeth 70 can also be wound for single or two phase operation. For convenience, one winding section is wound around at least some of the attachable teeth 90 and another winding section is wound around at least some of the integral teeth 70. In the preferred construction, the number of insertable teeth 90 is equal to the number of integral teeth 70, the position of the two types of teeth 70, 90 is alternating around the circumference, one of the winding sections is wound around all of the attachable teeth 90 and the other winding section is wound around all of the integral teeth 70. For a single-phase motor, before connection to the power supply, the two winding sections are electrically connected in series or parallel to define a single phase winding. In the motor slots that include two coil sides, both have the same polarity. In order to define a brushless PM motor, a single-phase stator as previously described is used in conjunction with a PM rotor so that the total number of stator teeth (integral plus insertable) is equal to the rotor polarity.

For a two-phase motor, with the phases spatially shifted by 90 electrical degrees, a winding section wound around at least some of the attachable teeth 90 is used to define a first phase, and a second winding section, which is wound around at least some of the integral teeth 70, is used to define a second phase. In order to define a brushless PM motor, a two-phase stator as previously described is used in conjunction with a PM rotor so that the total number of stator teeth (integral plus insertable) is equal to twice the rotor polarity.

For a two-phase motor, with the phase spatially shifted by 180 degrees, a motor also commonly referred to as uni-polar single-phase motor, a winding section wound around at least some of the attachable teeth is used to define a first phase and a second winding section, which is wound around at least some of the integral teeth, is used to define a second phase. In order to define a brushless PM motor, a two-phase stator as previously described is used in conjunction with a PM rotor so that the total number of stator teeth (integral plus insertable) is equal to the rotor polarity.

As mentioned previously, the stator according to the invention can be applied for other types of electrical machines, such as, for example, a.c. synchronous or asynchronous (induction) motors and generators. In an induction motor with a squirrel cage rotor, the polarity of the machine and of the rotor is determined by the polarity of the fundamental wave of the stator magnetomotive force (or of the harmonic wave with the largest magnitude), which can be calculated based on the distribution (pattern) of the stator winding through methods known to those skilled in the art.

The examples from FIGS. 19-23 show the insertable teeth 90 as having substantially the same width as the integral teeth 70 and the insertable teeth 90 having an enlarged tooth base. Variations, apart from those shown in FIGS. 13-16 are possible. For example, for the construction of FIG. 21, especially when used in a brushless PM motor, the integral teeth 70 can be thinner or wider than the attachable teeth 90, depending on the design objective. The constructions of FIGS. 22-23 can be built with all of the insertable and integral teeth 70, 90 having substantially the same tooth base profile (shape) in order to minimize the parasitic (harmonic) torques and forces, especially when used in a brushless PM motor of the poly-phase type. However, the constructions described have in common, among other things, the fact that at least some of the teeth are insertable in order to allow an increase of the slot-fill factor and enhance motor performance.

Thus, the invention provides, among other things, a new and useful stator 20 for an electric motor 10 and method of assembling the stator 20. The new stator 20 has improved electromagnetic and mechanical performance and enhanced manufacturability. The constructions of the stator 20 and the methods of assembling the stator 20 described above and illustrated in the figures are presented by way of example only and are not intended as a limitation upon the concepts and principles of the invention. Various features and advantages of the invention are set forth in the following claims.

What is claimed is:

1. A stator defining a stator axis, the stator comprising:
a yoke including at least one of a recess and a protrusion on an inner surface of the yoke;
a plurality of teeth, each tooth coupled to the inner surface of the yoke and defining a first recess, a first tooth end, and a second tooth end axially opposite the first tooth end, the first recess extending axially from the first tooth end toward the second tooth end, at least one tooth including the other of the recess and the protrusion to directly connect the tooth to the inner surface of the yoke; and a first coil including a first end coil and a second end coil, the first coil positioned on a first of the plurality of teeth such that the first end coil is disposed within the first recess such that the first end coil does not extend axially beyond the first tooth end.

2. A stator as set forth in claim 1 wherein each tooth includes a second recess extending axially from the second tooth end toward the first tooth end.

3. A stator as set forth in claim 2 wherein the second end coil is disposed within the second recess such that the second end coil does not extend axially beyond the second tooth end.

4. A stator as set forth in claim 1 wherein each of the plurality of teeth includes a powdered metal portion.

5. A stator as set forth in claim 1 wherein each of the plurality of teeth includes a first portion and a second portion separate from the first portion, each of the first portion and the second portion formed from a powdered metal.

6. A stator as set forth in claim 1 wherein the first coil is disposed around only the first tooth.

7. A stator as set forth in claim 1 wherein the yoke is formed from a plurality of laminations stacked in a stackwise direction and at least one of the plurality of teeth is formed from a powdered metal.

8. A stator as set forth in claim 1 wherein the plurality of teeth cooperate to define eighteen slots.

9. A stator as set forth in claim 1 wherein at least a portion of the plurality of teeth are formed separate from the yoke.

10. The stator of claim 1, wherein the yoke is formed as a single piece.

11. The stator of claim 1, wherein the yoke is formed from a soft magnetic composite as a single piece.

12. The stator of claim 1, wherein at least a portion of at least one of the plurality of teeth is formed from a stack of laminations stacked in a lengthwise direction.

13. The stator of claim 1, wherein at least a portion of each of the plurality of teeth is formed from a stack of laminations stacked in a lengthwise direction.

14. A stator defining a stator axis, the stator comprising:
a yoke;
a plurality of teeth, each tooth coupled to the yoke and defining a first recess, a first tooth end, and a second tooth end axially opposite the first tooth end, the first recess extending axially from the first tooth end toward the second tooth end; and
a first coil including a first end coil and a second end coil, the first coil positioned on a first of the plurality of teeth such that the first end coil is disposed within the first recess such that the first end coil does not extend axially beyond the first tooth end,
wherein the yoke extends in a lengthwise direction to define a core length, wherein each of the plurality of teeth includes
a tooth top coupled to the yoke and a coil-receiving portion, at least one tooth top extending in the lengthwise direction a first distance substantially equal to the core length, and the coil-receiving portion extending in the lengthwise direction a second distance that is shorter than the core length and wherein the first coil is
disposed around the coil-receiving space and defines a coil length that is substantially the same as the core length.

15. The stator of claim 14, wherein the yoke includes a plurality of laminations stacked in the lengthwise direction and the tooth is formed from a powdered metal.

16. The stator of claim 14, wherein the plurality of teeth includes a first plurality wherein each tooth is formed separate from the yoke and coupled to the yoke.

17. The stator of claim 16, wherein the plurality of teeth includes a second quantity of teeth integrally-formed as one piece with the yoke.

18. The stator of claim 17, wherein the first quantity is twice the second quantity.

19. The stator of claim 17, wherein the first quantity of teeth and the second quantity of teeth cooperate to define eighteen slots therebetween.

20. The stator of claim 14, wherein each of the plurality of teeth includes a first tooth portion formed separate from a second tooth portion, the first tooth portion and second tooth portion cooperating to completely define the tooth.

* * * * *